Patented June 27, 1933

1,915,828

UNITED STATES PATENT OFFICE

FREDERICK HENRY LANE, OF SALTLEY, BIRMINGHAM, ENGLAND, ASSIGNOR TO DUNLOP RUBBER COMPANY, LIMITED, A BRITISH CORPORATION

MANUFACTURE OF RUBBER ARTICLES WITH MOTTLED SURFACE ORNAMENTATION

No Drawing. Application filed February 27, 1931, Serial No. 518,909, and in Great Britain April 26, 1930.

This invention consists in a method for producing from aqueous dispersions of organic substances, articles which have provided on their surfaces mottled patterns or ornamentations, and it consists also in a method for imparting coatings of mottled patterns or ornamentations to surfaces of articles or materials.

The mottled surfaces produced are distinct from coloured jazz-type patterns or ornamentations in that no unidirectional coloured streaks are present due to or in the region of the aforesaid mottled effects.

Since the invention is particularly applicable to the manufacture of soft or hard rubber articles provided with mottled patterns or ornamentations and for imparting to the surfaces of materials coatings of soft or hard rubber having mottled patterns or ornamentations it will further be described with reference to articles made from dispersions of rubber such as rubber latex without, however, being limited thereto.

According to the present invention a shape or former or surface is preferably coated with one or more layers of aqueous dispersions of the kinds hereinafter specified and is then introduced subsequent to the coagulation of the aforesaid layers of dispersion into a bath containing a coarse aqueous emulsion or dispersion of suitably coloured rubber solutions.

After removal, the article is found to bear substantially adhering droplets of the coloured rubber solutions from the emulsions or dispersions thereof indiscriminately and non-uniformly distributed.

The type of effect produced and the manner of carrying the invention into effect depend, inter alia, on the viscosity of the rubber solution employed, the concentration of the aqueous emulsions or dispersions of the coloured rubber solution, and the amount of the dispersing agent employed for dispersing the coloured rubber solution. A high concentration of dispersion or low content of dispersing agent gives a very coarse mottling. On the other hand, if the dispersion is too strongly protected, successful precipitation on the articles is prevented.

If desired, particularly in those cases where rubber surfaces have not been recently treated with a coagulant, the surfaces to be provided with mottled patterns or ornamentations are first contacted with a coagulant such as 5% acetic acid solution. This preliminary coating of a coagulant is found to give rise to an increase in the amount of precipitation on the rubber of the particles of coarse suspension.

Multi-coloured effects can be obtained by using a mixture of coarse aqueous emulsions or dispersions. The coarse aqueous emulsions or dispersions can contain solutions of different colours dispersed successively. Alternatively, multi-coloured effects can be obtained by successive immersion in different coloured coarse aqueous emulsions or dispersions.

The processes described and claimed in Patents Nos. 1,849,246 and 1,832,574, can also be used for the purpose of this invention.

The present invention can also be applied to the articles produced according to copending application Serial No. 479,829 filed Sept. 5, 1930.

The shape or formers or surface may be covered with an aqueous emulsion or dispersion by any one or more of such known processes as dipping, spreading, spraying or electrophoresis. The aqueous emulsions or dispersions with which the shape or former or surface is covered may, for example, be natural or artificial dispersions of rubber or other natural resins in a concentrated non-compounded or compounded non-vulcanized or vulcanized condition and may be such as to yield, when dry and vulcanized, either soft or hard rubber articles.

The present invention is also applicable to articles of or containing rubber prepared by such known processes as mastification or caldering.

The mottled effects may be produced on such articles before or after vulcanization.

The following example illustrates how the invention can be effected—

A dispersion of rubber solution is prepared by adding naphtha or benzole solution of a suitably coloured rubber as, for instance, rubber coloured with such inorganic pigments as cadmium sulphide or vermilion to a 1.5% aqueous solution of ammonium oleate to give a concentration of approximately 5% rubber solution containing, for instance, 10% of rubber and 2% of pigment in the dispersion. A short vigorous stirring of approximately 30 seconds produces a breakdown of the rubber solution into particles ranging from 0.1 to 4 mm. in diameter. This dispersion is very coarse and needs agitation to prevent separation. The article to be provided with a mottled effect is dipped into this agitated dispersion and removed when it is found that precipitation of the particles has occurred thereon in such manner as to produce the mottled effect desired.

For articles made substantially from aqueous dispersions of rubber or the like, organic materials, dipping into coarse dispersions of coloured rubber solutions made in the aforementioned manner can take place conveniently immediately after coagulation of the deposit, whilst the deposit is still wet, or after drying thereof.

What I claim is:—

1. A method of providing a surface of rubber with a mottled ornamentation which comprises directly applying to said surface an aqueous emulsion or dispersion of suitably coloured rubber solution the dispersed particles of said emulsion ranging in size from about 0.1 to about 4 millimeters in diameter.

2. A method of forming mottled rubber goods which comprises continuously stirring a coloured rubber solution and a soap solution into water to disseminate the rubber in particles of magnitude ranging from about 0.1 to 4 millimeters in diameter in said water, and dipping a rubber article into the dispersion thus formed.

3. A method of forming mottled rubber goods which comprises continuously stirring a coloured rubber solution and a soap solution into water to disseminate the rubber in particles of magnitude ranging from about 0.1 to 4 millimeters in diameter in said water, forming a deposit of rubber material from a dispersion thereof, wetting the surface of said deposit with a coagulant and dipping it, while thus wetted, into the dispersion formed by stirring the rubber solution into water.

4. A method of providing a rubber surface with mottled ornamentation which comprises applying a coagulant to said surface and then bringing said surface into contact with an aqueous emulsion of suitably colored rubber solution the dispersed particles of said emulsion ranging in size from about 0.1 to about 4 millimeters in diameter.

5. A method of providing a rubber surfaces with mottled ornamentation which comprises applying an acetic acid to said surface and then bringing said surface into contact with an aqueous emulsion of suitably colored rubber solution the dispersed particles of said emulsion ranging in size from about 0.1 to about 4 millimeters in diameter.

6. A method of providing a rubber surface with mottled ornamentation of different colors which comprises contacting said surface with a coarse aqueous emulsion of a rubber solution of one color and thereafter contacting said surface with an aqueous emulsion of a rubber solution of different color the dispersed particles of said emulsion ranging in size from about 0.1 to about 4 millimeters in diameter.

7. A method of providing a rubber surface with vari-colored mottled ornamentation which comprises contacting said surface with an aqueous emulsion of rubber solutions of different colors the dispersed particles of said emulsion ranging in size from about 0.1 to about 4 millimeters in diameter.

8. A method of providing a rubber surface with a mottled ornamentation which comprises contacting said surface with aqueous dispersions of pigmented rubber solutions the dispersed particles of said emulsion ranging in size from about 0.1 to about 4 millimeters in diameter.

9. A method of providing a rubber surface with a mottled ornamentation which comprises precipitating on said surface dispersed rubber solutions of different colors from an aqueous emulsion thereof the dispersed particles of said emulsion ranging in size from about 0.1 to about 4 millimeters in diameter.

In witness whereof I have hereunto signed my name.

FREDERICK HENRY LANE.